(12) United States Patent
Kolasinski

(10) Patent No.: US 6,936,122 B2
(45) Date of Patent: *Aug. 30, 2005

(54) ADHESIVE BUBBLE REMOVAL METHOD AND APPARATUS FOR FIBER APPLICATIONS

(75) Inventor: John R. Kolasinski, Greenbelt, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 217 days.

This patent is subject to a terminal disclaimer.

(21) Appl. No.: 09/947,092

(22) Filed: Aug. 31, 2001

(65) Prior Publication Data

US 2002/0007895 A1 Jan. 24, 2002

Related U.S. Application Data

(63) Continuation of application No. 09/459,473, filed on Dec. 13, 1999, now Pat. No. 6,287,404.

(51) Int. Cl.[7] .............................. B04B 5/00; B04B 15/00
(52) U.S. Cl. .............................. 156/74; 156/87; 494/16; 494/85; 494/900; 215/286
(58) Field of Search ....................... 156/74, 87; 494/16, 494/21, 20, 37, 85, 900; 215/286

(56) References Cited

U.S. PATENT DOCUMENTS

| | | |
|---|---|---|
| 4,087,043 A | 5/1978 | Anderson et al. |
| 4,131,549 A * | 12/1978 | Ferrara ...................... 210/359 |
| 4,235,367 A | 11/1980 | Davidson |
| 4,290,550 A | 9/1981 | Chulay et al. |
| 4,451,250 A | 5/1984 | Romanauskas |
| 4,552,278 A | 11/1985 | Romanauskas |
| 5,236,409 A | 8/1993 | Romanauskas |
| 5,381,497 A | 1/1995 | Toland et al. |
| 5,399,144 A | 3/1995 | Romanauskas et al. |
| 6,287,404 B1 * | 9/2001 | Kolasinski ................... 156/74 |

FOREIGN PATENT DOCUMENTS

EP 0662801 B1 * 7/1995

* cited by examiner

Primary Examiner—Jeff H. Aftergut
(74) Attorney, Agent, or Firm—Christopher Kirkman

(57) ABSTRACT

An assembly for supporting a fiber optic termination or connector in a centrifuge and comprising a cylindrical body member having a top portion adapted to receive the ferrule body portion of a fiber optic termination or connector and a bottom portion for receiving a cylindrical piston/sealing unit. The piston portion of the piston/sealing unit includes a compressible tip which is adapted to a butt up against the outer end of the ferrule body portion of the fiber optic termination or connector. A cylindrical end cap fits over the upper end of the body member for holding the fiber optic termination in place on the body member and causing a seal to be formed between the termination or connector and the upper portion of the body member adjacent the compressible tip of the plunger. The parts, when fitted together, are placed in a centrifuge which is operated for a predetermined spin cycle, so as to cause any bubbles in the uncured liquid adhesive to be vented outwardly from the termination through the end cap. Subsequent removal of the fiber optic termination or connector from the centrifuge and assembly is "bubble free" and ready to be joined with an optical fiber which is inserted in the ferrule end of the termination or connector.

24 Claims, 2 Drawing Sheets

ADHESIVE BUBBLE REMOVAL METHOD AND APPARATUS FOR FIBER APPLICATIONS

This application is a continuation of and claims benefit of priority under 35 U.S.C. Section 120 to U.S. patent application Ser. No. 09/459,473, filed Dec. 13, 1999, now U.S. Pat. No. 6,287,404.

BACKGROUND OF THE INVENTION

1. Field of the Invention

This invention relates generally to bubble removal in uncured liquid adhesives and more particularly to the removal of bubbles or voids formed in the uncured liquid adhesive injected in a fiber optic termination or connector during the adhesive injection process.

2. Description of the Related Art

Most fiber optic assemblies are fabricated by bonding a connector or termination to an optical fiber with an adhesive. Bubbles and voids are introduced into the adhesive and the termination during adhesive mixing, adhesive applicator filling, and termination filler processes. Bubbles and voids in uncured adhesives can be responsible for optical fiber cracks developed during curing processes. In such an instance, the bubbles or voids expand as heat is applied. This can force out an excessive amount of adhesive at the termination end. Too much adhesive surrounding a protruding optical fiber at the termination end can cause some fibers to break during a subsequent heat curing process. It has been found that bubbles and voids in the cured adhesive are strongly correlated with subsequent fiber breakage in the termination, particular after the assembly is exposed to temperature cycling. As a result, product yield is reduced and manufacturing time and cost increased due to scrapped parts and retermination efforts.

Bubbles are generally removed from an uncured adhesive after it is mixed or after an applicator is filled with the mixed adhesive. There are two known techniques for removing bubbles or gas from uncured adhesives, namely: the centrifuge method and the vacuum chamber method. The centrifuge method involves placing the applicator or sealed mixing package containing uncured liquid adhesive in a centrifuge and subjecting it to a spin cycle. Currently there are no known techniques for removing bubbles from a connector or termination using a centrifuge after the liquid adhesive is injected into it. In the vacuum chamber method, the elements are subjected to a vacuum of a predetermined magnitude and duration to draw out the bubbles.

The use of a vacuum to remove bubbles or gas from an uncured adhesive may also be accompanied by the removal of volatile components or solvents from the adhesive. In some instances, the removal of such components may adversely affect the chemistry of the adhesive and thus change it or make it unreliable. Some of the adhesive properties that can change or degrade are: pot life, hardness, glass transition temperature and bond strength. Vacuum chambers are also cumbersome, inefficient, time consuming to use and costly.

Fiber cracking problems are also sometimes caused by the fabrication process sequence, where an optical fiber is bonded to a connector or termination using a shrinkable tube. The shrinkable tube or some other component is applied to the assembly before the liquid adhesive is heat cured. Unfortunately, the processes which use these shrinkable tubes or other components to hold the termination on the optical fiber prior to adhesive curing merely end up forcing the liquid adhesive out the other side from the end of the termination. Bubbles or voids present in the adhesive expand when heated. If not allowed to escape or be vented from the assembly, they also force the adhesive out of the end of the termination. As noted above, too much adhesive surrounding a protruding optical fiber at the termination end can also cause the fiber to break during the heat curing process. Accordingly, the removal of bubbles must be carried out prior to curing, i.e. being subjected to the application of heat.

SUMMARY

Accordingly, it is an object of the present invention to provide a method and apparatus for removing bubbles of voids from the liquid adhesive injected into a fiber optical termination or connector, where the bubbles or voids are introduced into the termination or connector during the adhesive injection process.

It is another object of the invention to provide an assembly used in connection with a centrifuge for holding a fiber optic termination or connector containing uncured adhesive.

It is a further object of the invention to remove bubbles and voids from a fiber optic termination or connector containing uncured liquid adhesive using a centrifuge without letting the liquid adhesive escape or run out during a spin cycle of the centrifuge.

The foregoing and other objects are achieved by a fixture used in connection with a centrifuge for removing a bubble or void in the adhesive present in a fiber optic termination or connector prior to the bonding of an optical fiber thereto, comprising: a transparent elongated body member having a first or upper end portion for receiving a ferrule/body portion of a fiber optic termination or connector and providing a seat thereat for the termination or connector; a piston and sealing unit sized for insertion into a second or lower end portion of said body member and having an end member for abutting a tip of the ferrule portion of a termination or connector and closing off an axial bore therein; and an elongated end cap member having a first end or lower portion sized so as to fit over the first or upper end portion of said body member for exerting pressure on the piston and sealing unit at least in the region of the termination or connector and a second or upper end portion for receiving a body portion of the termination or connector including an open ended chamber containing adhesive, said second or upper end portion of the end cap additionally having an aperture for venting any bubble or void in the adhesive from the end cap during removal thereof.

The invention is also directed to a method of removing bubbles or voids from fiber optic adhesive located in a fiber optic termination or connector prior to the bonding of an optical fiber thereto, and comprising the steps of: placing a fiber optic termination or connector including a ferrule end portion and an adhesive entry end portion containing liquid adhesive on an outer end portion of a generally tubular body member, with the ferrule end portion protruding into the tubular body member; placing a generally tubular end cap member over the entry end portion of the termination or connector and the outer end portion of the body member, causing a pressure to be extended on the body member to thereby seal the ferrule end portion of the termination or connector against the body member; inserting a generally tubular piston and sealing unit in a lower end portion of the tubular body member until contact is made with the ferrule end portion of the termination or connector for temporarily sealing an axial bore in the end portion of the ferrule which ultimately receives an optical fiber and forming a composite fixture from these elements; placing the fixture in a centrifuge; operating the centrifuge for a predetermined time period, so as to vent any bubble from the liquid adhesive through the end cap member; and removing the fixture therein from the centrifuge now having a bubble free termination or connector.

Further scope of the applicability of the present invention will become apparent from the detailed description provided hereinafter. However, it should be understood, that the detailed description and specific examples disclosing the preferred embodiments of the invention are given by way of illustration only since various changes and modifications within the spirit and scope of the invention will become apparent to those skilled in the art from a reading of this detailed description.

BRIEF DESCRIPTION OF THE DRAWINGS

The present invention will become more fully understood when the detailed description is considered together with accompanying drawings which are provided by illustration only and thus are not limitative of the present invention, and wherein.

DETAILED DESCRIPTION OF THE INVENTION

Figure 1:
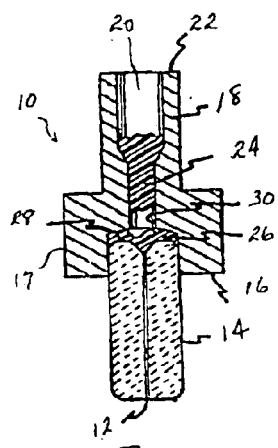
FIG. 1 is a longitudinal cross sectional view generally illustrative of a generic fiber optic termination.

Referring now to the drawings and more particularly to FIG. 1, shown thereat is what is commonly referred to as a termination 10 for an optical fiber which typically comprises part of a conventional optical fiber connector. An optical fiber, not shown, fits into an axial bore 12 formed in a ceramic ferrule 14 which is fitted to the inner end portion 16 of an optical fiber termination body member 18. The termination body member 18 is typically comprised of metal and includes a relatively larger axial bore 20 in its outer end 22. The bore 20 is used to receive liquid adhesive 24 where it flows toward the inner end 26 of the ferrule 14 where a small chamber 28 is located in the inner end portion 16 of termination body 18. When adhesive is injected via a needle or otherwise fed into the bore 20 of the termination body member 18, a void or bubble 30 can develop therein, typically near or in the chamber 28. The filling or injecting of the adhesive is accomplished either mechanically or by hand prior to a curing operation which is carried out by a well known heating process before an optical fiber is inserted into the bore 12 and bonded to the termination body member 18.

Figure 2:
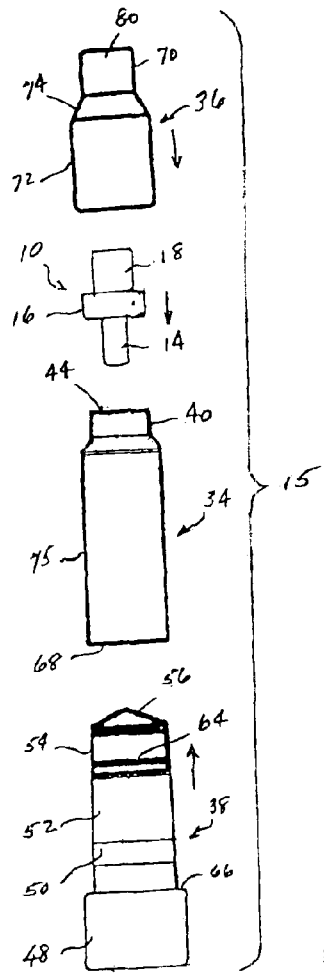
FIG. 2 is an exploded view illustrative of the components of a fiber optic termination holding fixture in accordance with the preferred embodiment of the subject invention.
Figure 4:
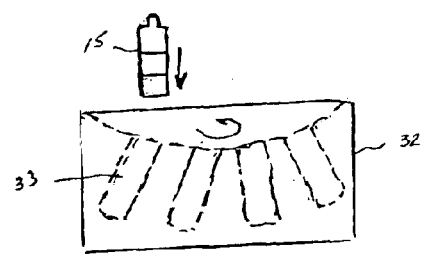
FIG. 4 is a diagram broadly illustrative of the assembly shown in FIGS. 2 and 3 being inserted into the centrifuge.

In the present invention, the bubble 30 is removed by utilizing the apparatus shown in FIG. 2 in connection with a centrifuge shown in FIG. 4 by reference numeral 32.

Figure 5A:
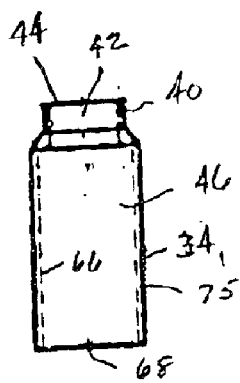
FIGS. 5(a), 5(b) and 5(c) are illustrative of three variations of the body member for various types of connectors which forms part of the assembly shown in FIG. 2.
Figure 5B:
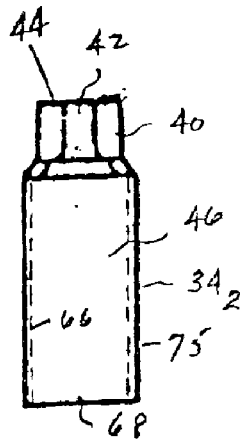
Figure 5C:
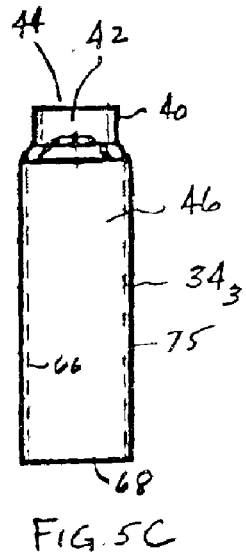

Referring now to FIG. 2, shown thereat are the three major components of a fixture 15, i.e. an assembly in accordance with the subject invention, for holding a fiber optic termination or connector, for example the termination 10 shown in FIG. 1, for insertion in a centrifuge 32 (FIG. 4). As shown in FIG. 2, the fixture 15 is comprised of an elongated tubular, i.e., cylindrical body member 34, three examples of which $34_1$, $34_2$, and $34_3$ are shown in FIGS. 5A, 5B and 5C; a tubular or cylindrical cap 36, two examples $36_1$ and $36_2$ which are shown in FIGS. 6A and 6B; and piston/sealing unit 38, the details of which are shown in FIG. 7.

Figure 3:
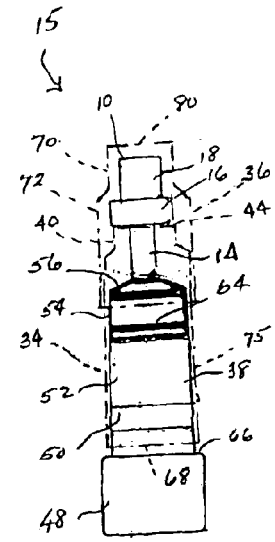
FIG. 3 is a longitudinal cross sectional view generally illustrative of the components shown in FIG. 2 assembled together for insertion into a centrifuge.

With respect to the body members $34_1$, $34_2$ and $34_3$, they are transparent and designed to hold several types of conventional fiber optic terminations or connectors, not shown, currently in use. Each body member has a first or upper end portion 40 of reduced diameter and a bore 42 for receiving and holding a particular termination or connector so that the ferrule portion thereof protrudes downwardly inside the body member, with a shoulder or bottom of the termination/connector sometimes coming to rest on the upper rim 44. The interior portion 46 of each body member $34_1$, $34_2$, and $34_3$ is adapted to receive the piston/sealing unit 38 as shown in FIG. 3.

Figure 7:
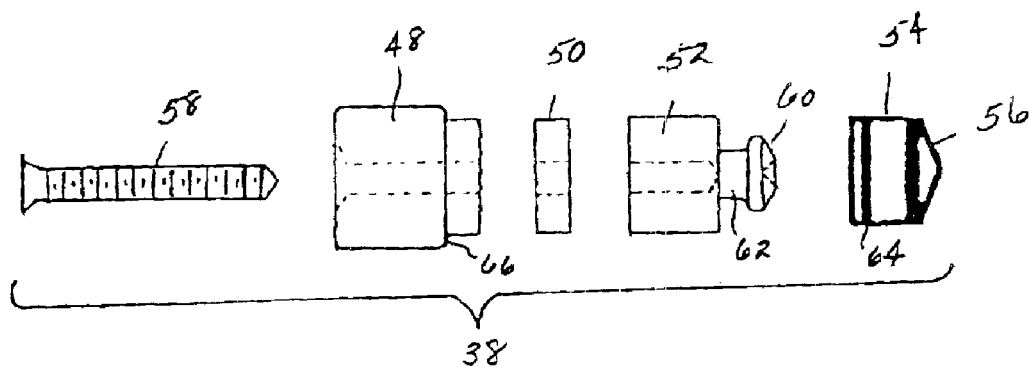
FIG. 7 is an exploded view shown illustrative of the components included in the piston and sealing unit which forms part of the assembly shown in FIG. 2.

The details of the piston/sealing unit 38 are shown in FIG. 7 and are comprised of, for example, a base or plug member 48, an annular spacer member 50, a piston retainer member 52, and a relatively short resilient end member in the form of a piston 54 having a compressible tip 56. A single screw 58 is used to fasten all of the elements together. The piston 54 is affixed to the retainer member 52 via a small semi-hemispherical button 60 located at the end of a neck type member 62. This piston 54 also includes a small piston ring 64 for engaging the inside wall 66 of a body member 34 with which it is used. When the elements of the piston/sealing unit are fastened together, it is inserted into the interior 46 of the cylindrical body member 34 until the shoulder 66 of the plug member 48 almost abuts the rim 68 at the bottom or second end of the body member 34. Also when the piston/sealing unit 38 is inserted into the body member 34, the resilient tip 56 of the piston 54 contacts and closes the bore, for example, the bore 12 of the ferrule 14 (FIG. 1).

Figure 6A:
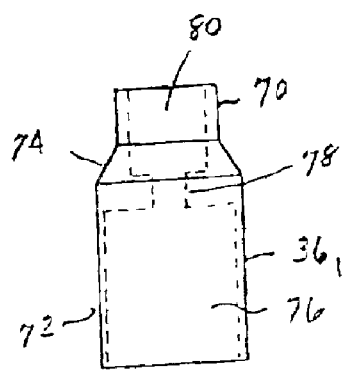
FIGS. 6(a) and 6(b) are illustrative of two variations of a cylindrical end cap for various connector types which forms part of the assembly shown in FIG. 2.
Figure 6B:
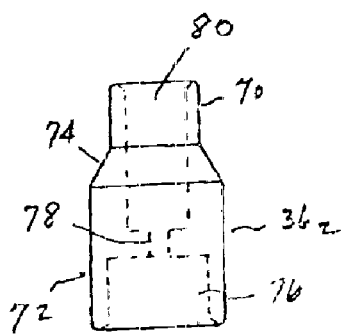

Considering now the cylindrical end cap 36, which is also tubular in its construction, in the two versions $36_1$, and $36_2$ thereof as shown in FIGS. 6A and 6B, each member includes an upper end portion 70, a body portion 72, and a sloped shoulder portion 74. Each end cap 36 includes an interior portion 76 in its lower end portion which is sized to fit over the outer surface 75 or the upper end portion 40 of the cylindrical body member 34 depending on the connector 10, a neck region 78, and an aperture 80 which forms a vent for permitting a bubble to exit from the termination 10.

In operation when, for example, the chamber 24 of the fiber optic termination 10 or a complete optical fiber connector is filled or injected with liquid adhesive in a well known manner via a syringe needle, the adhesive filled termination 10 is inserted ferrule end first into the body member 34 as shown in FIG. 2. The cap member 36 is then placed over the body member 34 and forced down, causing the inner end portion of the termination 10 to be sealed against the wall of the body member. The piston/sealing unit 38 is then inserted into the body member 34 where the bore 12 of the ferrule 14 is closed off, as shown in FIG. 3.

Alternatively, the steps involving the end cap and sealing unit can be reversed as follows. The sealing unit 38 is first partially slid into the body member 34, followed by the termination 10 or a complete connector being placed on the body member 34. Then the cap member is firmly seated over the termination 10. Finally, the sealing unit 38 is fully pushed up into the body member 38 completing the seal of the bore 12.

The fixture 15 containing the termination 10 is then placed into a cavity 33 (FIG. 4) of the centrifuge 32, where it is operated for several minutes, typically two or three minutes depending upon the adhesive. The fixture 15 is then manually removed from the centrifuge where the termination 10 can thereafter be removed or left until such time as it is needed. When the termination 10 is removed from the fixture 15, the body member 34 and piston 54 are checked for any signs of adhesive 24 (FIG. 1) that may have been expelled from the termination end portion 16 due to improper seating on the transparent body member 34. The transparency of the body member 34 readily provides for this inspection. This check for expelled adhesive is merely a safety precaution and is not necessary if the assembly is clean and functions properly.

During the centrifuge operation, the heavier liquid adhesive is forced down by centrifugal force, causing any bubble, for example bubble 30 (FIG. 1) that may have been formed in the liquid adhesive 24 to move in the opposite direction toward the upper end 18 of the termination 10 and to the venting aperture 80 in the cap 36. Once the termination 10 is removed from the fixture 15, it will be "bubble free" and ready for curing and subsequent receiving an optical fiber which is fitted into the axial bore 12 of the ferrule 14 for bonding.

Having thus described the invention with respect to its preferred embodiments, it should be noted that this detailed description has been provided by way of explanation and is not meant to be considered in a limiting sense. Accordingly, all modifications, alterations and changes coming within the spirit and scope of the invention as set forth in the appended claims are meant to be included.

What is claimed is:

1. A method for removing bubbles from a viscous substance located within an open-ended connector, comprising:
   placing a second end of the open-ended connector containing the viscous substance in a first end of an elongated member, the open-ended connector having a first end and a second end;
   sealing a second end of the elongated member with a sealing member;
   placing an end cap over the first end of the elongated member and the open-ended connector such that the open-ended connector is held and centered with respect to the elongated member;
   placing an assembled elongated member, end cap, sealing members, and open-ended connector in a bubble removing device; and
   removing the bubbles from the viscous substance.

2. The method for removing bubbles as claimed in claim 1, wherein sealing further includes sealing the second end of the open-ended connector.

3. The method for removing bubbles as claimed in claim 1, wherein the bubbles are removed in a centrifuge.

4. The method for removing bubbles as claimed in claim 1, wherein the end cap has a space through which the first end of the open-ended connector protrudes, thereby holding and centering the open-ended connector with respect to the elongated member.

5. The method for removing bubbles as claimed in claim 1, wherein sealing further includes adjustably moving the sealing member with respect to the elongated member.

6. The method for removing bubbles as claimed in claim 1, wherein the open-ended connector is a fiber optic connector.

7. A method for removing bubbles from a viscous substance located within a fiber optic termination, comprising:
   placing a second end of the termination containing the viscous substance in a first end of an elongated member, the termination having a first end and a second end;
   sealing a second end of the elongated member and the second end of the termination with a sealing member;
   placing an end cap over the first end of the elongated member and the termination such that the termination is held with respect to the elongated member and the first end of the termination protrudes into a space in the end cap;
   placing an assembled elongated member, end cap, sealing member, and termination in a bubble removing device; and
   removing the bubbles from the viscous substance.

8. The method for removing bubbles as claimed in claim 7, where removing the bubbles includes subjecting the viscous substance to centrifugal force.

9. A fixture for use in association with a device for removing bubbles from a viscous substance, the fixture comprising:
   an elongated member having a first end and a second end, the first end receiving a termination containing the viscous substance, the termination having a first end and a second end;
   a sealing means for sealing the second end of the elongated member and the second end of the termination; and
   an end cap sized to fit onto the first end of the elongated member, the end cap including a space for holding and centering the first end of the termination.

10. The fixture according to claim 9, wherein the termination is cylindrical.

11. The fixture according to claim 9, wherein the space includes an aperture for venting bubbles from the viscous substance.

12. The fixture according to claim 9, wherein the viscous substance is a polymer.

13. The fixture according to claim 9, wherein the viscous substance is an adhesive polymer.

14. The fixture according to claim 9, wherein the elongated member, the termination, the sealing means, and the end cap are placed in a bubble removing device to remove the bubbles from the viscous fluid.

15. The fixture according to claim 14, wherein the bubble removing device is a centrifuge.

16. The fixture according to claim 9, wherein the sealing means includes a resilient portion for abutting the second end of the termination.

17. The fixture according to claim 16, wherein the end cap pushes on the termination such that the second end of the termination is pressed into the resilient portion and sealed.

18. The fixture according to claim 9, wherein the end cap is removably attached to the first end of the elongated member.

19. The fixture according to claim 18, wherein the end cap has a first end and a second end, and wherein a friction force holds and seals the second end of the end cap and first end of the elongated member together.

20. The fixture according to claim 9, wherein the termination is a fiber optic termination.

21. The fixture according to claim 9, wherein the sealing means is adjustable with respect to the elongated member.

22. The fixture according to claim 9, wherein the sealing means is in the form of a piston.

23. The fixture according to claim 9, wherein a friction force holds and seals the elongated member and the first end of the sealing means together to prevent subsequent leakage.

24. A fixture for use in association with a device for removing bubbles from a viscous substance, the fixture comprising:

an elongated member having a first end and a second end, the first end receiving a termination containing the viscous substance, the termination having a first end and a second end;

an end cap having a first end and a second end, the second end of the end cap being sized to fit onto the first end of the elongated member, the end cap including a space for receiving the first end of the termination, wherein the second end of the end cap frictionally seals the first end of the elongated member; and a sealing unit for sealing the second end of the elongated member.

* * * * *